March 29, 1960  L. M. BOYD ET AL  2,930,579
TURBINE GUIDE VANE LOCKING AND VIBRATION
Filed Sept. 19, 1955  PREVENTING ARRANGEMENT
2 Sheets-Sheet 1

Inventors
LAWRENCE M. BOYD
JOHN C. McKEAN

By Fetherstonhaugh & Co.
Attorneys

March 29, 1960

L. M. BOYD ET AL 2,930,579

TURBINE GUIDE VANE LOCKING AND VIBRATION PREVENTING ARRANGEMENT

Filed Sept. 19, 1955

Inventors
LAWRENCE M. BOYD
JOHN C. McKEAN

By Fetherstonhaugh & Co.
Attorneys

United States Patent Office 2,930,579
Patented Mar. 29, 1960

2,930,579

TURBINE GUIDE VANE LOCKING AND VIBRATION PREVENTING ARRANGEMENT

Lawrence M. Boyd, Senneville, Quebec, and John C. McKean, Montreal, Quebec, Canada, assignors to Dominion Engineering Works Limited, Montreal, Quebec, Canada Application September 19, 1955, Serial No. 535,183

6 Claims. (Cl. 253—24)

This invention relates to improved means for locking the guide vanes of a turbine against vibration and oscillations when the turbine is being used as a turbo-pump.

The invention consists essentially in locking both ends of the turbine guide vane stems by means of a simple hydraulically operated locking means whereby the guide vanes are held axially rigid in frictional contact on tapered seats in any adjusted position of the guide vanes and are instantly unlocked on release of the hydraulically operated locking means, the locking means, including the tapered seating on the guide vane shafts, being isolated completely from the fluid passing through the turbine. The locking means include fixed tapered seats and a sectional tapered ring, the sectional tapered ring being normally held apart from the fixed tapered seat by means of a heavy spring.

The object of the invention is to provide a simple and easy means to operate turbine guide vane adjusting means which can be locked in any adjusted position in one simple operation.

A further object of the invention is to provide a turbine guide vane lock which will hold the guide vane axially rigid against any tendency towards vibration and oscillation when the turbine is being used as a turbo-pump.

A further object of the invention is to provide a turbine guide vane lock which can be operated at both upper and lower ends of the guide vanes by means of hydraulic displacement of the locking mechanism.

A further object of the invention is to provide a turbine guide vane lock in which the sectional tapered ring is brought into frictional contact with a tapered seat and is expanded to frictionally engage with the side walls of the turbine ring member for increased locking pressure.

A further object of the invention is to provide a guide vane locking mechanism which will reduce wear in the guide vane bearings and will reduce the stresses normally transmitted to the upper stem of the guide vane.

A further object of the invention is to provide a guide vane locking mechanism which can be adjusted for wear without dismantling the turbine.

In the drawings, which illustrate embodiments of the invention.

Figure 1:
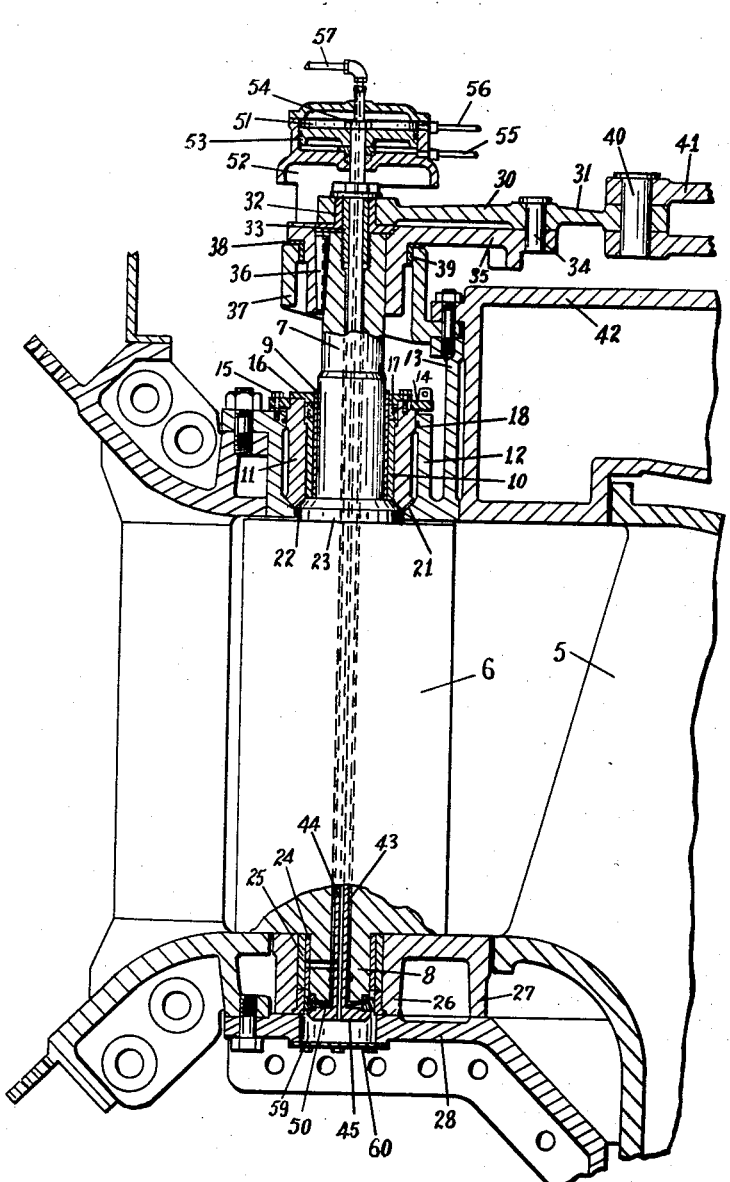
Fig. 1 is a vertical section through a part of a turbine structure having a vertical axis showing one of the guide vanes of the turbine with its position adjusting mechanism and showing the means for locking the turbine guide vane stems at top and bottom.
Figure 2:
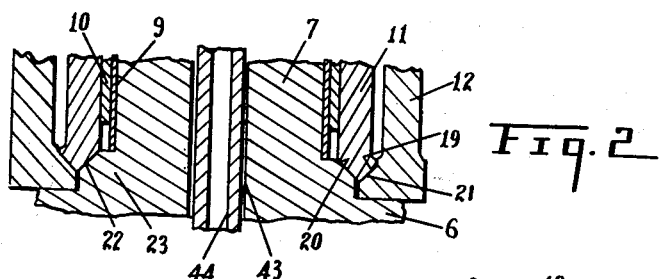
Fig. 2 is an enlarged part sectional view taken from Fig. 1 and showing, in detail, the tapered seating of the upper stem of the turbine guide vane.
Figures 3, 4:
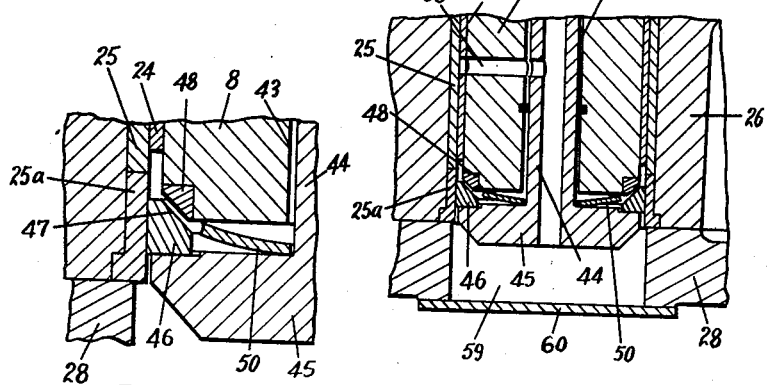
Fig. 3 is an enlarged part sectional view taken from Fig. 1 and showing in detail the locking mechanism for the lower stem of the turbine guide vane.
Fig. 4 is an enlarged section showing the lower stem locking means in the unlocked position and the spring washer holding the locking means separated.
Figure 5:
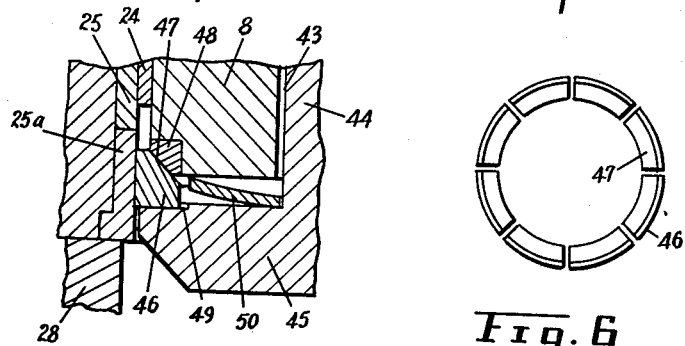
Fig. 5 is a view similar to Fig. 4 showing the lower stem locked and the spring washer compressed.
Figure 6:
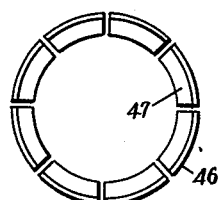
Fig. 6 is a plan view of the sectional locking ring.

Referring to the drawings, 5 designates the impeller-runner of the turbine and 6 one of the adjustable guide vanes which are arranged in circular series around the impeller runner in accordance with conventional practice.

Each guide vane 6 is equipped with upper and lower stems, respectively indicated at 7 and 8 which are journalled in suitable bearings to provide a fixed axis about which the guide vane may be rotated to various positions of adjustment.

The principal components of the bearing in which the upper guide vane stem 7 is journalled include a sleeve 9 fitted on the lower portion of the stem 7, a bearing bushing 10 surrounding the sleeve 9, an adjustable bearing sleeve 11 in which the bushing 10 is fitted and a cylindrical member 12 in which the sleeve 11 is fitted, said member 12 being formed as an integral part of the outer head cover 13. The adjustable sleeve 11 is held in place by means of the collar 14 and secured by the stud bolts 15. A gland 16 is secured to the upper end of the sleeve 11 and a packing 17 is interposed between the gland 16 and the upper end of the sleeve 11 and about the sleeve 9. The upper portion of the sleeve 11 is formed to present a seal ring portion 18 engaging with a similar seal ring portion of the cylindrical member 12. The lower end of the sleeve 11 presents an outer tapered seat 19 and an inner tapered seat 20. The outer tapered seat 19 bears against a complementary tapered seat 21 at the lower end of the cylindrical member 12. The inner tapered seat 20 is opposed to a complementary tapered seat 22 formed on an integral enlargement or shoulder 23 of the guide vane stem 7. The collar 14 holds the sleeve 11 against rotation but allows for vertical adjustment of the sleeve 11 to compensate for wear on the tapered seats 19 and 20 against the tapered seats 21 and 22.

The principal components of the bearing for the lower stem 8 of the guide vane 6 include a sleeve 24 fitted on the stem 8, a bearing bushing 25 surrounding the sleeve 24 and a cylindrical bearing member 26 in which the bushing 25 is secured, said bearing member 26 being formed integral with the bottom ring 27 which encircles the lower end of the runner 5 and is supported by the base ring 28. The bushing 25 is preferably made in two parts, the lower part 25a acting as a wear ring against which the locking sections 46 are expanded as explained hereafter.

The guide vanes 6 are rotated to different positions of adjustment by operating means generally indicated at 30. This operating means 30 may be of any suitable type but is here shown, by way of example, as including an operating lever 31 having one end supported on the upper end of guide vane stem 7 by a wear plate or bushing 32 for rotation about a lever retaining stud 33 screwed into the upper end of the stem 7. An intermediate portion of the lever 31 is secured by a shear pin 34 to one end of a coupling member 35 whose opposite end is secured to the upper end of the stem 7, by a key 36. The end of the coupling member 35 which is keyed to the stem 7 is rotatably supported by a bearing ring 37 through the medium of the bearing plate 38 and bushing 39. The end of the lever 31 remote from the stem 7 is connected by a link pin 40 to a link 41 of a conventional lever actuating mechanism (not shown). The bearing ring 37 is shown as being detachably secured to the inner head cover 42, but, if desired, it may be formed as an integral part of said inner head cover.

The guide vanes 6 and their upper and lower stems 7 and 8 are pierced by a vertical bore 43 in which a hollow lifting rod 44 is fitted for vertical sliding movement. The lower end of the lifting rod 44 carries a lifting cap 45 supporting thereon a circular series of tapered locking sections or segments 46 presenting tapered surfaces 47 opposed to a tapered seat 48. The upper surface of the lifting rod cap 45 is under cut to provide a seat at 49 the radial depth of which will allow for radial movement of the sections 46. A spring 50 is interposed between the central portion of the lifting cap 45 and the lower end of the guide vane stem 8. This spring may be of the bellville type or of any other form having sufficient strength to lift the guide vane 6 and effect engagement of the upper tapered seats 20 and 22 in one direction and in the other direction effect separation of the tapered sections 46 from the tapered seat 48.

The upper portion of each of the lifting rods 44 extend through the lever retaining studs 33 into a hydraulic cylinder 51 which are supported by the head cover assembly of the turbine through the bracket 52. A piston 53 reciprocating in the cylinders 51 is secured to the lifting rod 44 by the retaining nut 54. The cylinders 51 are provided with a pressure connection 55 through which pressure fluid is supplied to and exhausted from the cylinder 51 to effect displacement of the piston 53. A drain opening 56 on the upper end of the cylinders allows fluid which has accumulated on the top side of the piston 53 to be drained off.

Provision for greasing the lower stub shaft 8 and bushing 25 is provided at 57, the grease being forced down through the hollow lifting rod 44 and into the bearing through the radial aperture 58.

When the turbine is to be used as a turbo-pump the guide vanes 6 may be adjusted to any desired position by the operating means 30 and then locked against vibration and oscillation by supplying pressure fluid to the pressure supply inlet 55 of the cylinder 51 of each guide vane. The application of pressure fluid under the piston 53 moves the piston 53 upwards in its cylinder and carries with it the lifting rod 44. During this upward movement of the lifting rod 44 the guide vane 6, by means of the spring 50, is raised until the tapered seat 22 of the upper guide vane stem 7 is firmly seated against the inner tapered seat 20 of the adjustable sleeve 11 in wedging engagement therewith. Subsequent upward movement of the lifting rod 44 compresses the spring 50 thus permitting wedging of the tapered locking sections 46 between the tapered seat 48 and the wear ring bushing 25a. These operations thereby lock the guide vane 6 at its upper and lower ends against vibration and oscillation.

It will be obvious that the aforesaid means for locking the guide vane stems 7 and 8 against vibration also serves to retain the guide vane 6 in the position to which it is adjusted prior to the raising of the lifting rod 44 of the locking mechanism.

The holding of the guide vane axially rigid at top and bottom has the further effect of nullifying all clearances in the bearings and eliminates vibration of the guide vane and the transfer of additional stresses to the upper stem of the guide vane also, when the turbine is operating as a turbo-pump the locking mechanism restrains torsional oscillations in the guide vanes and eliminates wear in the bushings.

What we claim is:

1. In a turbine having a main casing including a head cover and a bottom ring, a turbine runner and a series of adjustable guide vanes disposed between said head cover and bottom ring and about said turbine runner, in combination, a series of upper guide vane bearings disposed around the said head cover of the turbine, a series of lower guide vane bearings disposed around the bottom ring of the turbine and in axial alignment with the upper guide vane bearings, said upper guide vane bearings including an axially adjustable annular tapered bearing seat, the said guide vanes having upper and lower stems journalled in the said upper and lower guide vane bearings, the upper stem of the guide vanes having a tapered shoulder complementary to the annular tapered bearing seat of the upper bearing, a lower annular tapered bearing seat on said lower stem of the guide vanes, an annular sectional tapered ring complementary to said lower tapered bearing seat, a lifting rod for each of said guide vanes, said rods passing axially through said guide vane stems, means connected thereto to raise said lifting rods and therewith lift said guide vanes to bring said tapered shoulders into contact with the tapered bearing seat of the upper guide vane bearings and said annular sectional tapered ring into wedging contact with said lower tapered bearing seat and said lower guide vane bearing to lock said guide vanes against rotation in their adjusted position.

2. In a turbine having a main casing including a head cover and a bottom ring, a turbine runner and a series of adjustable guide vanes disposed between said head cover and bottom ring and about said turbine runner, in combination, a series of upper guide vane bearings disposed around the said head cover of the turbine, a series of lower guide vane bearings disposed around the bottom ring of the turbine and in axial alignment with the upper guide vane bearings, said upper guide vane bearings including an axially adjustable annular tapered bearing seat, facing downwardly of the head cover, the said guide vanes having upper and lower stems journalled in the said upper and lower guide vane bearings, the upper stems of the guide vanes having a tapered shoulder complementary to the downwardly facing annular tapered bearing seat of the upper bearing, a lower downwardly facing annular tapered bearing seat on said lower stem of the guide vanes, an annular sectional tapered ring complementary to said lower tapered bearing seat, a lifting rod for each of said guide vanes, said rods passing axially through said guide vane stems, means connected thereto to raise said lifting rod upwards and therewith lift said guide vanes to bring said tapered shoulders into locking contact with the tapered bearing seat of the upper guide vane bearings and said annular sectional tapered ring into wedging contact in an axial and radial direction with said lower tapered bearing seat and with said lower guide vane bearing to lock said guide vanes against rotation in their adjusted position.

3. In a turbine having a main casing including a head cover and a bottom ring, a turbine runner and a series of adjustable guide vanes disposed between said head cover and bottom ring and about said turbine runner, in combination, a series of upper guide vane bearings disposed around the said head cover of the turbine, a series of lower guide vane bearings disposed around the bottom ring of the turbine and in axial alignment with the upper guide vane bearings, said upper guide vane bearings including an axially adjustable annular tapered bearing seat facing downwardly of the head cover, the said guide vanes having upper and lower stems journalled in the said upper and lower guide vane bearings, the upper stems of the guide vanes having a tapered shoulder complementary to the downwardly facing annular tapered bearing seat of the upper bearing, a lower downwardly facing annular tapered bearing seat on said lower stem of the guide vanes, an annular sectional tapered ring complementary to said lower tapered bearing seat, a lifting rod for each of said guide vanes, said rods passing axially through said guide vane stems, means to raise said lifting rods and vanes, each of said means comprising a cylinder, a piston attached to the upper end of each of said lifting rods and reciprocatingly mounted in said cylinders, said lifting rods and vanes, when raised bringing said tapered shoulders into locking contact with the tapered bearing seat of the upper guide vane bearings and said annular sectional tapered ring into wedging contact in an axial and radial direction with said lower tapered bearing seats and with said lower guide vane bearings to lock said guide vanes against rotation in their adjusted position.

4. In a turbine having outer cover members, a turbine runner, guide vanes, each of said guide vanes having a stem extending from each end thereof, said stems being rotatably journaled in said cover members, said guide vanes being spaced around the periphery of the turbine runner, an annular tapered bearing seat formed on one of said cover members, a tapered shoulder on one of said stems of each guide vane adapted to seat on said bearing seat, a tapered bearing seat on the other stem of each guide vane, an annular tapered bearing ring adapted to seat on said last named bearing seat and means including rods connected with said guide vanes and raising means operably connected to said rods for bringing the first named bearing seat into engagement with the tapered shoulder and for simultaneously bringing the last named bearing seat into engagement with the tapered bearing ring to lock said guide vanes against rotation.

5. In a turbine having a main casing including a head cover and bottom ring, a turbine runner disposed within said casing, guide vanes disposed around the periphery of said turbine runner, upper and lower stems on said guide vanes rotatably journalled in the head cover and bottom ring, respectively, an upper annular tapered bearing seat in said head cover for each of said guide vanes, a tapered shoulder on the upper stem of said guide vanes complementary to the upper bearing seat, a lower bearing seat on the lower stem of said guide vanes, an annular tapered ring disposed adjacent said lower bearing seat, a lifting rod for each of said vanes, said lifting rod passing through the guide vane stems and means connected to said lifting rods for raising said lifting rods to bring the tapered shoulder and tapered ring into wedging contact with the tapered bearing seats to lock the guide vanes against rotation.

6. In a turbine according to claim 5 and further including spring means to hold said tapered shoulder and tapered ring out of engagement with the bearing seats associated therewith.

References Cited in the file of this patent

UNITED STATES PATENTS

| | | |
|---|---|---|
| 2,300,766 | Baumann | Nov. 3, 1942 |
| 2,372,518 | Robinson | Mar. 27, 1945 |
| 2,412,365 | Sollinger | Dec. 10, 1946 |
| 2,660,121 | Curtis et al. | Nov. 24, 1953 |
| 2,733,853 | Trumpler | Feb. 7, 1956 |

FOREIGN PATENTS

| | | |
|---|---|---|
| 728,815 | Great Britain | Apr. 27, 1955 |
| 736,032 | Great Britain | Aug. 31, 1955 |